US012662097B2

(12) United States Patent
Ganzel

(10) Patent No.: US 12,662,097 B2
(45) Date of Patent: Jun. 23, 2026

(54) BRAKE SYSTEM APPARATUSES, METHODS, AND ARRANGEMENTS

(71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 543 days.

(21) Appl. No.: 18/306,403

(22) Filed: Apr. 25, 2023

(65) Prior Publication Data

US 2024/0359674 A1 Oct. 31, 2024

(51) Int. Cl.
| | |
|---|---|
| *B60T 13/74* | (2006.01) |
| *B60T 7/04* | (2006.01) |
| *B60T 8/88* | (2006.01) |
| *B60T 8/92* | (2006.01) |
| *B60T 13/14* | (2006.01) |
| *B60T 13/58* | (2006.01) |
| *B60T 13/68* | (2006.01) |
| *F15B 7/08* | (2006.01) |

(52) U.S. Cl.
CPC ............... *B60T 8/92* (2013.01); *B60T 7/042* (2013.01); *B60T 8/885* (2013.01); *B60T 13/142* (2013.01); *B60T 13/58* (2013.01); *B60T 13/686* (2013.01); *B60T 13/745* (2013.01); *F15B 7/08* (2013.01); *B60T 2220/04* (2013.01); *B60T 2270/203* (2013.01); *B60T 2270/402* (2013.01); *B60T 2270/404* (2013.01); *B60T 2270/82* (2013.01)

(58) Field of Classification Search
CPC ................. B60T 13/745; B60T 13/746; B60T 2270/402; B60T 2270/404; B60T 2270/413; B60T 8/368
See application file for complete search history.

(56) References Cited

U.S. PATENT DOCUMENTS

| | | | |
|---|---|---|---|
| 7,837,582 B2 * | 11/2010 | Smith | .................... F16H 7/1281 |
| | | | 474/138 |
| 7,993,226 B2 * | 8/2011 | Mack | ....................... F16F 15/12 |
| | | | 474/135 |
| 9,278,679 B2 | 3/2016 | Leiber et al. | |
| 9,827,960 B2 | 11/2017 | Feigel et al. | |
| 11,305,747 B1 * | 4/2022 | Lee | ........................ B60T 13/662 |

(Continued)

*Primary Examiner* — Bradley T King
(74) *Attorney, Agent, or Firm* — Tarolli, Sundheim, Covell & Tummino LLP

(57) ABSTRACT

A brake system for actuating a plurality of wheel brakes in a normal non-failure braking mode and in a backup braking mode includes an MC-type power transmission unit having a first electric motor. An iso/dump control valve arrangement is associated with each wheel brake of the plurality of wheel brakes. A pump piston is associated with at least one wheel brake of the plurality of wheel brakes. The pump piston is driven by a second electric motor for selectively providing pressurized hydraulic fluid to the iso/dump control valve arrangement. At least one electric brake motor is operative to selectively drive a selected wheel brake. A first electronic control unit is operative to selectively control the first electric motor. A second electronic control unit is operative to selectively control the second electric motor. A third electronic control unit is operative to control the at least one electric brake motor.

22 Claims, 8 Drawing Sheets

(56) References Cited

U.S. PATENT DOCUMENTS

| | | | | |
|---|---|---|---|---|
| 2003/0024245 A1* | 2/2003 | Fulks | B60T 13/745 | |
| | | | 60/545 | |
| 2005/0192143 A1* | 9/2005 | Sasaki | B62D 5/0448 | |
| | | | 474/135 | |
| 2014/0095044 A1* | 4/2014 | Kikawa | B60T 13/686 | |
| | | | 701/70 | |
| 2014/0203626 A1* | 7/2014 | Biller | B60T 7/02 | |
| | | | 303/14 | |
| 2016/0009263 A1* | 1/2016 | Feigel | B60T 11/224 | |
| | | | 303/15 | |
| 2017/0028976 A1* | 2/2017 | Pattok | F16H 7/1281 | |
| 2017/0072920 A1* | 3/2017 | Besier | B60T 8/4081 | |
| 2017/0129469 A1* | 5/2017 | Besier | B60T 13/142 | |
| 2017/0291590 A1* | 10/2017 | Shigeta | F15B 7/08 | |
| 2017/0341630 A1* | 11/2017 | Zipfel | B60T 8/321 | |
| 2018/0029577 A1* | 2/2018 | Beauvais | B60T 8/176 | |
| 2018/0105156 A1* | 4/2018 | Kishi | B60T 13/745 | |
| 2018/0236974 A1* | 8/2018 | Kubb | B60T 17/22 | |
| 2018/0334149 A1* | 11/2018 | Feigel | B60T 13/745 | |
| 2020/0070788 A1* | 3/2020 | Michels | B60T 7/085 | |
| 2021/0046909 A1* | 2/2021 | Saotome | B60T 13/686 | |
| 2022/0041150 A1* | 2/2022 | Leiber | B60T 13/12 | |
| 2022/0126806 A1* | 4/2022 | Leiber | B60T 8/40 | |
| 2022/0153240 A1* | 5/2022 | Leiber | B60T 13/662 | |
| 2022/0185118 A1* | 6/2022 | Li | B60T 13/74 | |
| 2022/0194339 A1* | 6/2022 | Tarandek | B60T 13/745 | |
| 2022/0227340 A1* | 7/2022 | Kim | H02K 7/102 | |
| 2022/0274572 A1* | 9/2022 | Ganzel | B60T 13/745 | |
| 2023/0012180 A1 | 1/2023 | Ahn et al. | | |
| 2023/0146790 A1* | 5/2023 | Kim | B60T 17/22 | |
| | | | 303/3 | |
| 2024/0001899 A1* | 1/2024 | Stanojkovski | B60T 13/686 | |
| 2024/0116484 A1* | 4/2024 | Watanabe | B60T 13/662 | |
| 2024/0166180 A1* | 5/2024 | Weh | B60T 13/745 | |
| 2024/0174207 A1* | 5/2024 | Yang | B60T 8/172 | |
| 2024/0190406 A1* | 6/2024 | Ozsoylu | B60T 13/686 | |
| 2025/0042381 A1* | 2/2025 | Courth | B60T 7/042 | |
| 2025/0050853 A1* | 2/2025 | Ganzel | B60T 8/4081 | |
| 2025/0145130 A1* | 5/2025 | Ganzel | B60T 13/148 | |
| 2025/0145134 A1* | 5/2025 | Kim | B60T 13/662 | |
| 2025/0189018 A1* | 6/2025 | Strieter | F16H 7/12 | |

* cited by examiner

BRAKE SYSTEM APPARATUSES, METHODS, AND ARRANGEMENTS

TECHNICAL FIELD

This disclosure relates to an apparatus and method for use of brake systems and, more particularly, to methods, apparatuses, and arrangements of brake systems.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking. An example of a brake system and related components is disclosed in U.S. patent application Ser. No. 17/708,070, filed 30 Mar. 2022 and titled "MC-type power transmission unit and Brake Systems Using Same", the entire contents of which are incorporated herein by reference for all purposes.

SUMMARY

In an aspect, a brake system for actuating a plurality of wheel brakes in a normal non-failure braking mode and in a backup braking mode is provided. The brake system includes an MC-type power transmission unit having a first electric motor for at least partially pressurizing hydraulic fluid. First and second output lines are provided for routing the pressurized hydraulic fluid from the MC-type power transmission unit. An iso/dump control valve arrangement is associated with each wheel brake of the plurality of wheel brakes. A first traction control iso valve is hydraulically interposed between the MC-type power transmission unit and at least one iso/dump control valve arrangement via the first output line. A second traction control iso valve is hydraulically interposed between the MC-type power transmission unit and at least one iso/dump control valve arrangement via the second output line. A pump piston is associated with at least one wheel brake of the plurality of wheel brakes. The pump piston is driven by a second electric motor for selectively providing pressurized hydraulic fluid to the iso/dump control valve arrangement of the at least one associated wheel brake. A reservoir is hydraulically connected to the MC-type power transmission unit and each of the iso/dump control valve arrangements. At least one electric brake motor is operative to selectively drive a selected wheel brake. A first electronic control unit is operative to selectively control the first electric motor of the MC-type power transmission unit. A second electronic control unit is operative to selectively control the second electric motor, at least one of the iso/dump control valve arrangements, and at least one of the first and second traction control iso valves. A third electronic control unit is operative to control the at least one electric brake motor.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figures 1, 2:
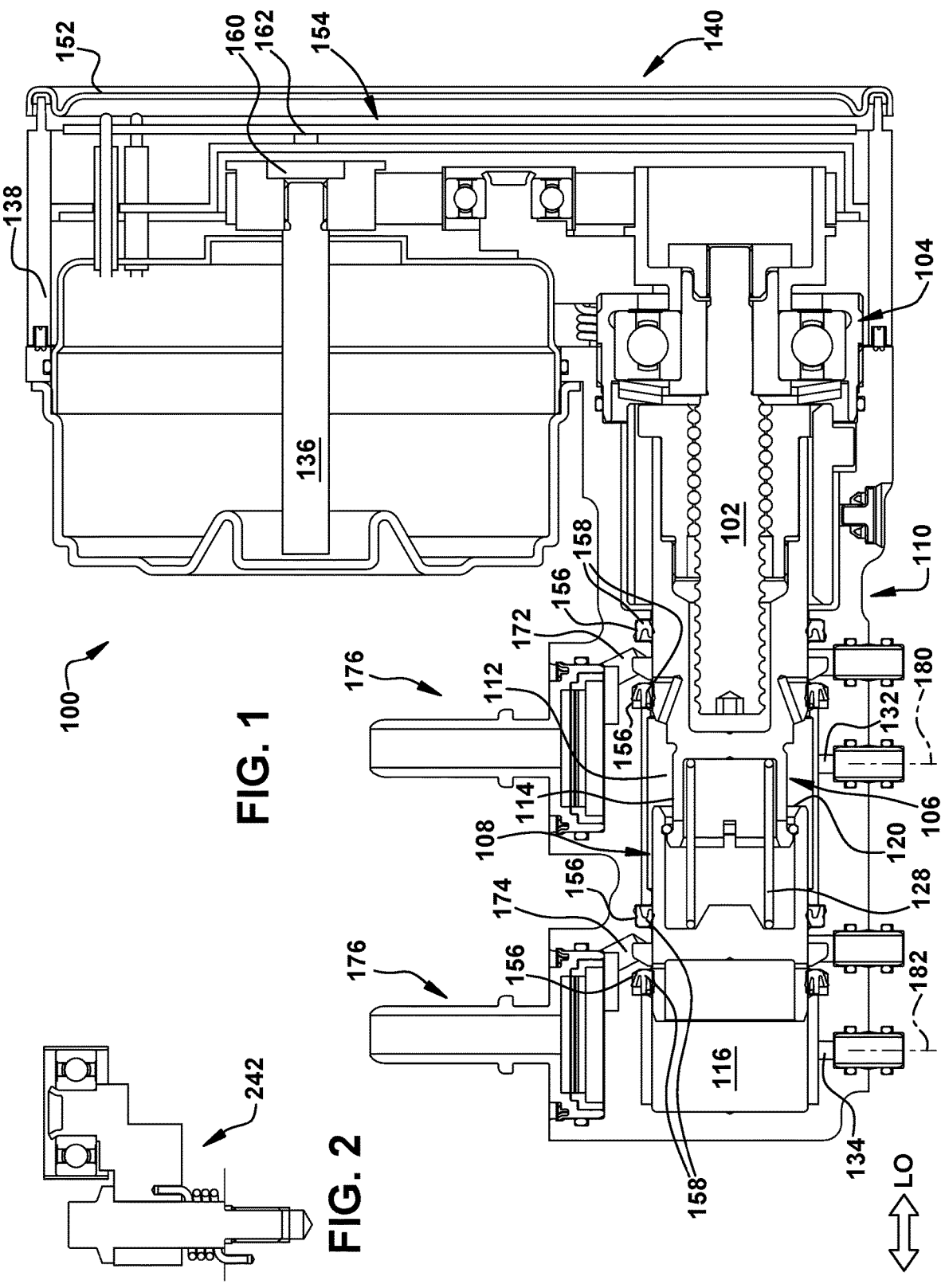
FIG. 1 is a schematic cross-sectional side view of a first example configuration of a brake system component.
FIG. 2 is a schematic side view of a structure which can be used with the brake system component of FIG. 1.
Figure 3:
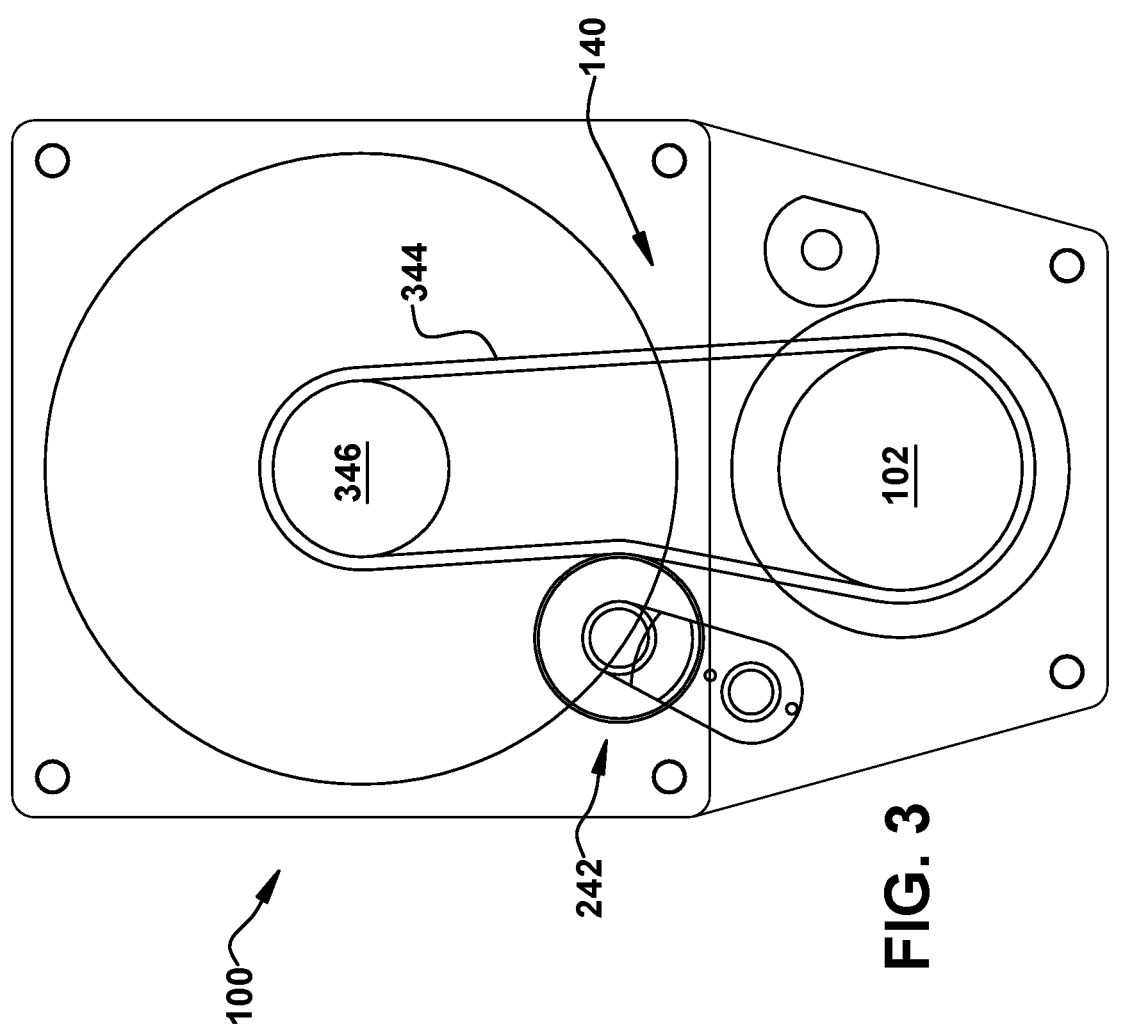
FIG. 3 is a schematic end view of the brake system component of FIG. 1.

FIGS. 1-3 schematically depict a power transmission unit of a master cylinder type, hereafter referenced for brevity as a motor-driven power transmission unit or MC-type PTU 100. The MC-type PTU 100 includes a ball screw 102, a ball nut 104 selectively driven by the ball screw 102 for longitudinal motion relative thereto, and a primary piston 106 operatively coupled to the ball nut 104 (e.g., via a press-fit, threaded, or any other suitable connection therebetween). The primary piston 106 is indirectly driven by the ball screw 102 via engagement of the primary piston 106 with the ball nut. A secondary piston 108 is operatively coupled to the primary piston 106, though in many use environments, this will be a flexible (non-rigid) connection.

A block housing 110 at least partially encloses the primary piston 106, the secondary piston 108, and the ball screw 102. A primary chamber 112 is at least partially defined by the block housing 110 and a surface 114 of the primary piston 106. The primary chamber 112 is configured to contain hydraulic fluid and is selectively pressurized by reciprocal motion of the primary piston 106 with respect to the block housing 110. The primary piston 106 is driven directly by longitudinal motion of the ball nut 104. At least a portion of the ball nut 104 extends into an interior cavity of the primary piston 106. The term "longitudinal", as used herein, is substantially in the horizontal direction, in the orientation of FIG. 1, and is indicated by arrow "Lo".

A primary spring 128 may be interposed longitudinally between the primary and secondary pistons 106 and 108. The primary spring 128 selectively resists longitudinally directed compressive force therebetween. One of ordinary skill in the art will be readily able to provide a primary and spring 128 having desired characteristics for a particular use environment, such as facilitating substantially simultaneous shutoff of fluid outputs from the primary and secondary chambers 112 and 116. The secondary piston 108 is attached, directly or indirectly, to the primary piston 106 for travel therewith.

A secondary chamber 116 is at least partially defined by the block housing 110 and a face 118 of the secondary piston 108. A backside 120 of the secondary piston 108 at least partially defines the primary chamber 112. The secondary chamber 116 is configured to contain hydraulic fluid and is selectively pressurized by reciprocal motion of the secondary piston 108 with respect to the block housing 110 driven indirectly by longitudinal motion of the ball nut 104. That is, longitudinally oriented force toward the left, in the orientation of FIG. 1, is transmitted in a "tandem" manner from the ball screw 102, through the ball nut 104, to the primary piston 106 and to the secondary piston 108 attached thereto. As a result, the primary and secondary pistons 106 and 108 can both be driven by the ball screw 102. The primary spring 128 will resist this leftwardly oriented force, and tend to urge the secondary piston 108 toward the left, in the orientation of FIG. 1.

A first output channel 132 selectively places the primary chamber 112 in fluid communication with at least one component of a brake system for provision of pressurized hydraulic fluid thereto. A second output channel 134 selectively places the secondary chamber 116 in fluid communication with at least one component of a brake system for provision of pressurized hydraulic fluid thereto. An example brake system using the MC-type PTU 100 will be discussed in detail below, with reference to FIG. 6. For certain use environments of the MC-type PTU 100, the first and second output channels 132 and 134 may be arranged relative to the block housing 110 such that rotation of the ball screw 102 drives the primary and secondary pistons 106 and 108 longitudinally to block fluid flow from the reservoir and thus prevent fluid from flowing back into the reservoir during operation of the MC-type PTU 100.

A first electric motor 136 is provided for selectively driving the ball screw 102 to responsively reciprocate at least one of the primary and secondary pistons 106 and 108 within a corresponding primary or secondary chamber 112 or 116. A motor housing 138, which may be integrally formed with the block housing 110, or separately provided and attached thereto, at least partially encloses the ball nut 104 and the electric motor 136.

An electronic control unit housing 152 may be selectively connected to a portion of the block housing 110 spaced longitudinally apart from the primary and secondary chambers 112 and 116. The electronic control unit housing 152 encloses an electronic control unit 154 ("ECU") therein for operative connection to the electric motor 136.

The first electric motor 136, as shown in the Figures, is of an indirect driving type, with a drive mechanism 140 mechanically interposed between the first electric motor 136 and the ball screw 102. In the MC-type PTU 100 shown in FIG. 1, the drive mechanism 140 is of a PTU belt drive system type (which encompasses a belt drive, chain drive, or any other desired elongate rotary motion shifting mechanism). FIG. 2 depicts a spring-loaded idler 242 which can be used to assist with achieving desired tensioning of the PTU belt drive system type drive mechanism 140. As shown in FIG. 3 (an end view looking longitudinally from right to left within the plane of the page of FIG. 1), a belt 344 transfers rotary motion from a motor output shaft 346 (e.g., via a motor pulley) to the ball screw 102 (e.g., via a spindle pulley), either directly or with any desired mechanical components interposed therebetween. While the idler 242 is shown in FIGS. 2-3, the belt 344 could be pre-tensioned, or desired tension could be maintained in the drive mechanism 140 in any suitable manner, with or without an idler 242.

Accordingly, and as shown in FIGS. 1-3, the first electric motor 136 is drivingly coupled to the ball screw 102 by a PTU belt drive system type drive mechanism 140. Any desired mechanical advantage can be provided to the MC-type PTU 100 via selection/sizing of components of the PTU belt drive system type drive mechanism 140. One of ordinary skill in the art can readily provide any desired mechanism(s), or components thereof, to transfer rotary motion from a motor output shaft 346 to a substantially parallel-extending ball screw 102 for a particular use environment of the MC-type PTU 100.

Each of the primary and secondary chambers 112 and 116 may include at least one annular sealing groove 156 configured to contain an annular seal 158, of any desired type, for resisting egress of hydraulic fluid from the respective primary or secondary chamber 112 or 116 in an undesirable direction. For example, a v-seal could be provided to a rightmost (in the orientation of FIG. 1) sealing groove 156 of at least one of the primary and secondary chambers 112 and 116, and a w-seal, or recup seal, could be provided to a more leftwardly oriented (in the orientation of FIG. 1) sealing groove 156 of at least one of the primary and secondary chambers 112 and 116, to provide desired sealing properties in a particular use environment. This is the arrangement shown, by way of example, in FIG. 1.

Primary and secondary reservoir channels 172 and 174 may be provided to the block housing 110 to place the primary and secondary chambers 112 and 116, respectively, into fluid communication with a reservoir of a brake system, as will be described below. The reservoir may be attached directly to the block housing 110, using a coupling feature (shown generally at 176), or in any other desired manner. One of ordinary skill in the art will be able to readily provide a suitable arrangement for achieving desired couplings for a particular use environment of the MC-type PTU 100.

For connection of the MC-type PTU 100 to a brake system 178, as will be described below, a primary output line 180 is in fluid connection with the primary chamber 112 (such as via the first output channel 132) and a secondary output line 182 is in fluid connection with the secondary chamber 116 (such as via the second output channel 134). The primary and secondary output lines 180 and 182 are shown schematically in FIG. 1, and may be provided to a particular brake system 178 by one of ordinary skill in the art.

A magnet 160 and a magnetically-sensitive sensor 162 (e.g., a Hall-effect sensor) may be provided to the first electric motor 136 and the ECU 154, respectively. When present, the magnet 160 and the sensor 162 may cooperatively provide at least the ECU 154 with a motor signal responsive to sensed motion (e.g., rotation and/or position) of at least a portion of the first electric motor 136 (e.g., of the motor output shaft 346). Accordingly, one of ordinary skill in the art will be readily able to monitor at least one of speed, position, rotational direction, rotary motion, or any other suitable sensed quality of the first electric motor 136 as desired. This monitoring may be helpful in managing operation of a brake system 178 associated with the first electric motor 136.

Figure 4:
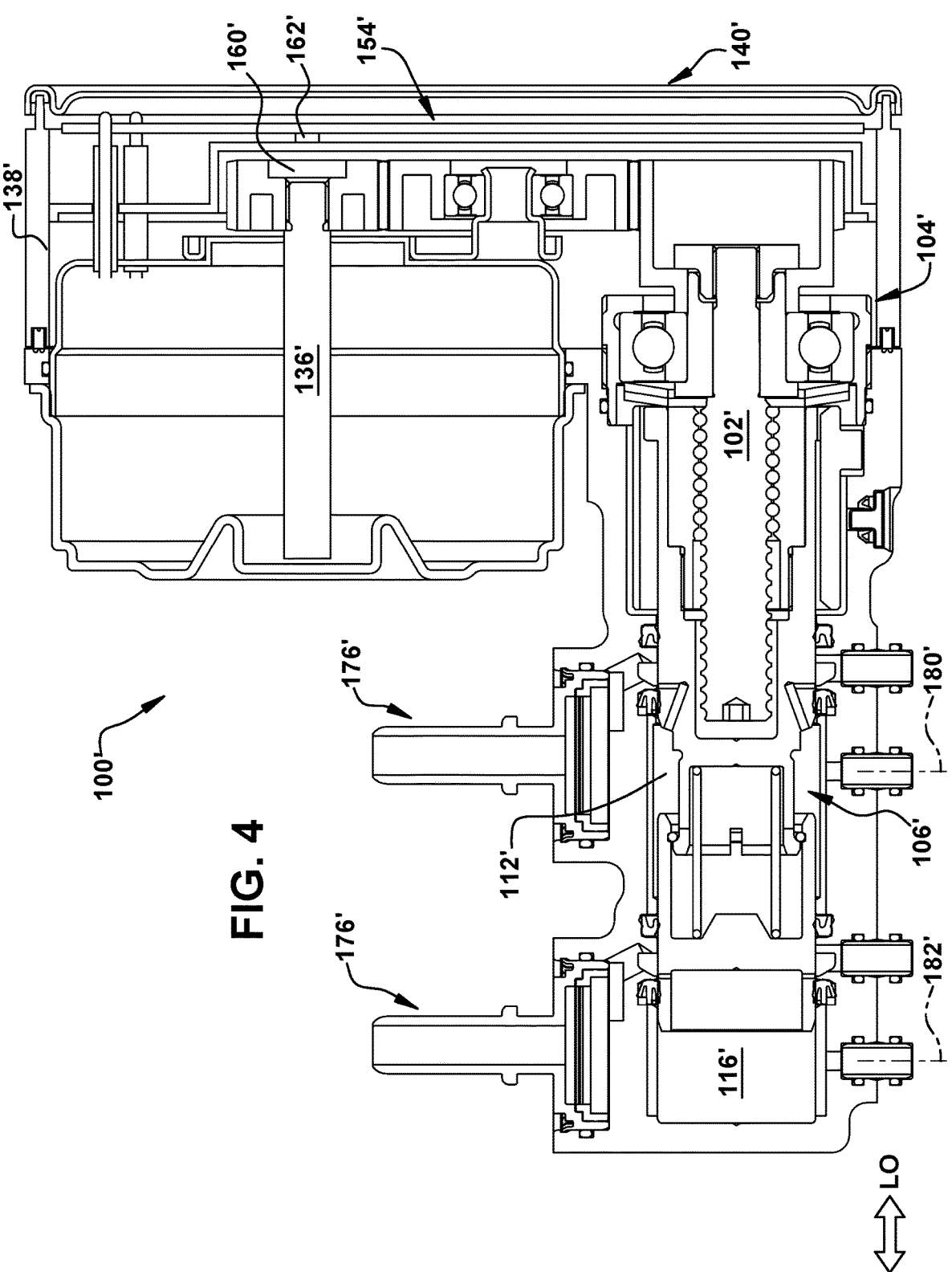
FIG. 4 is a schematic cross-sectional side view of a second example configuration of a brake system component.
Figure 5:
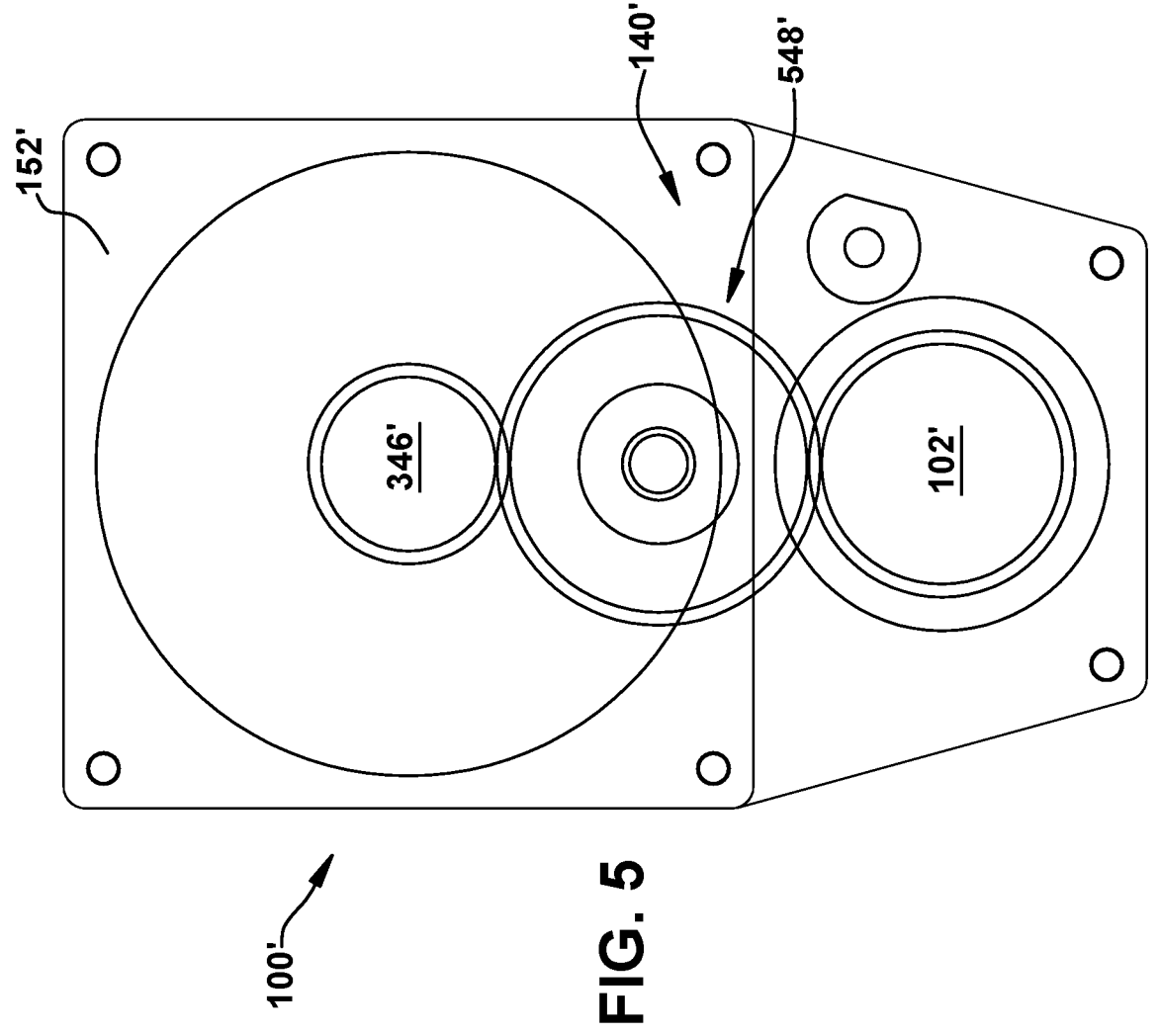
FIG. 5 is a schematic end view of the brake system component of FIG. 4.

FIGS. 4-5 schematically depict a second embodiment of an MC-type PTU 100'. The MC-type PTU 100' of FIGS. 4-5 is similar to the MC-type PTU 100 of FIGS. 1-3 and therefore, structures of FIGS. 4-5 that are the same as or similar to those described with reference to FIGS. 1-3 have the same reference numbers with the addition of a "prime"

mark. Certain description of common elements and operation similar to those in the previously described first embodiment will not be repeated with respect to the second embodiment, but should instead be considered to be incorporated below and in the drawings by reference as appropriate.

In FIGS. 4-5, the drive mechanism 140' is a PTU gear train type drive mechanism. Similarly to the drive mechanism 140 of the first embodiment, the drive mechanism 140' of the second embodiment is operative to transfer rotary motion from the motor output shaft 346' (e.g., via a motor gear), through an idler gear 548, and to the ball screw 102' (e.g., via a spindle gear). As with the MC-type PTU 100 of the first embodiment, the MC-type PTU 100' of the second embodiment include transfer of rotary power from a longitudinally extending motor output shaft 346' to a substantially parallel longitudinally extending ball screw 102'.

Accordingly, and as shown in FIGS. 4-5, the first electric motor 136' is drivingly coupled to the ball screw 102' by a PTU gear train type drive mechanism 140'. Any desired mechanical advantage can be provided to the MC-type PTU 100' via selection/sizing of components of the PTU gear train type drive mechanism 140'. One of ordinary skill in the art can readily provide any desired mechanism(s), or components thereof, to transfer rotary motion from a motor output shaft 346' to a substantially parallel-extending ball screw 102' for a particular use environment of the MC-type PTU 100'.

Figure 6:
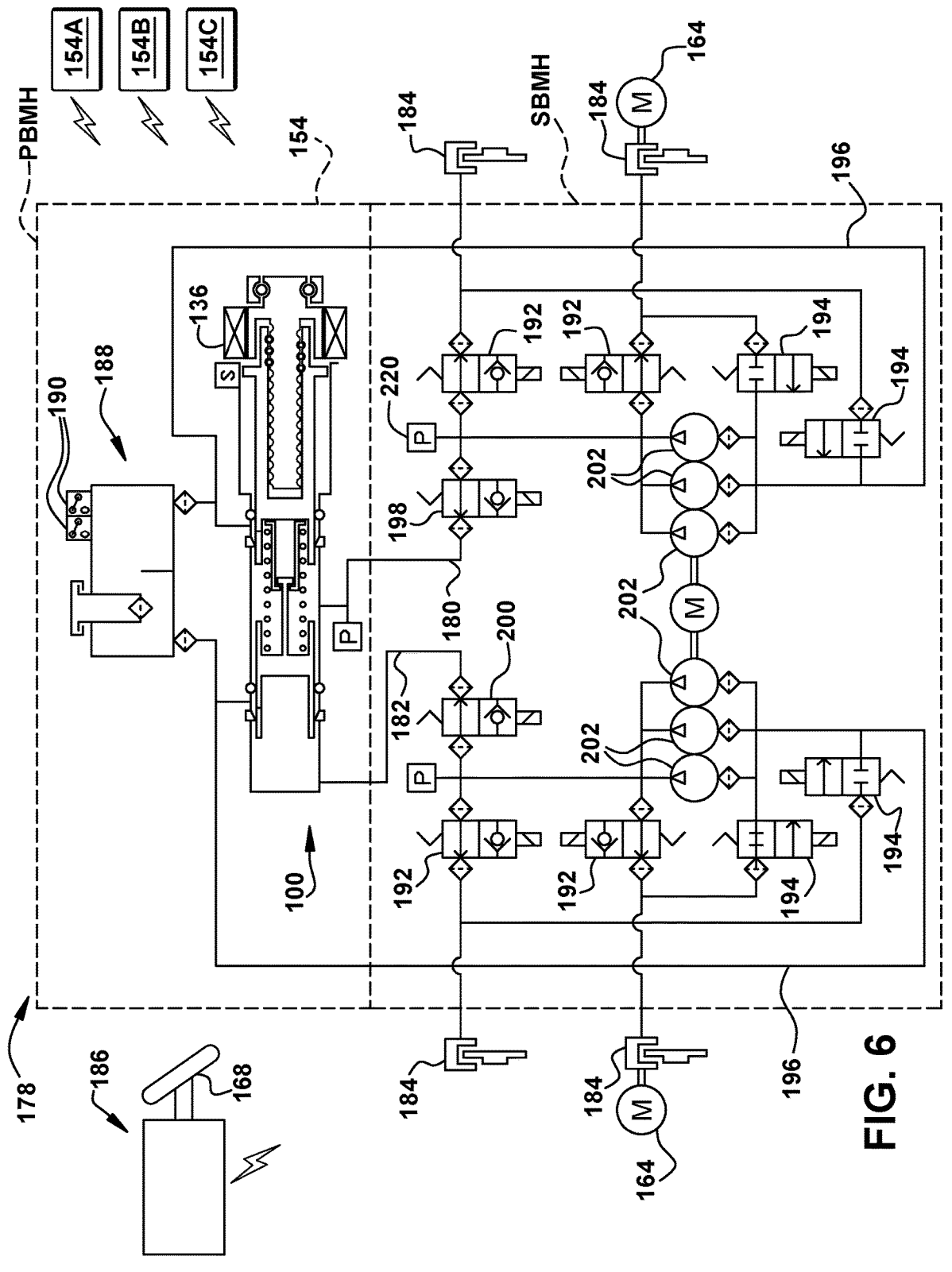
FIG. 6 is a schematic hydraulic diagram of a an example brake system which may use the brake system component of FIG. 1 or 4.
Figures 7, 8:
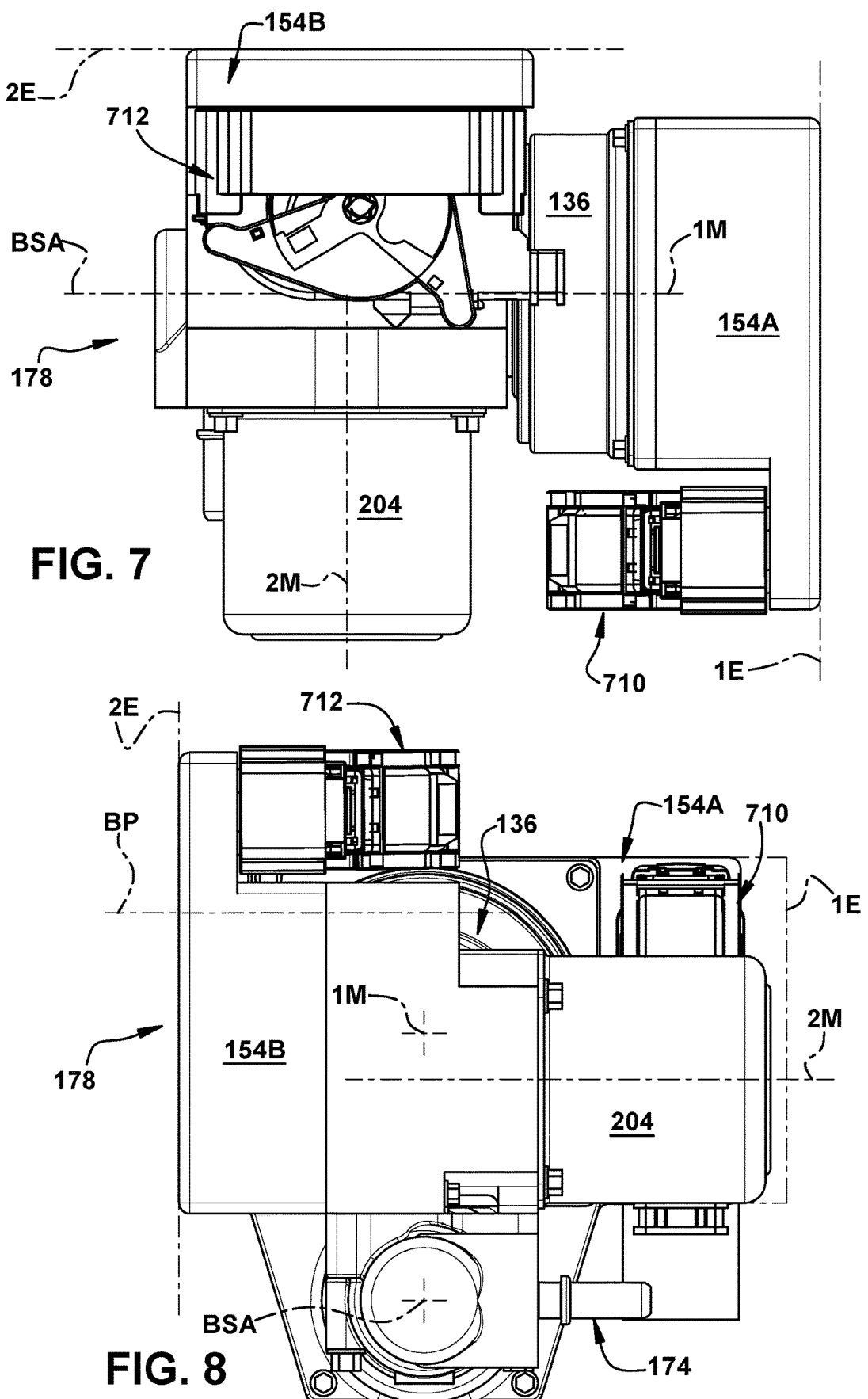
FIG. 7 is a top view of an example arrangement of the brake system structure of FIG. 6.
FIG. 8 is a side view of the example arrangement of FIG. 7.
Figure 9:
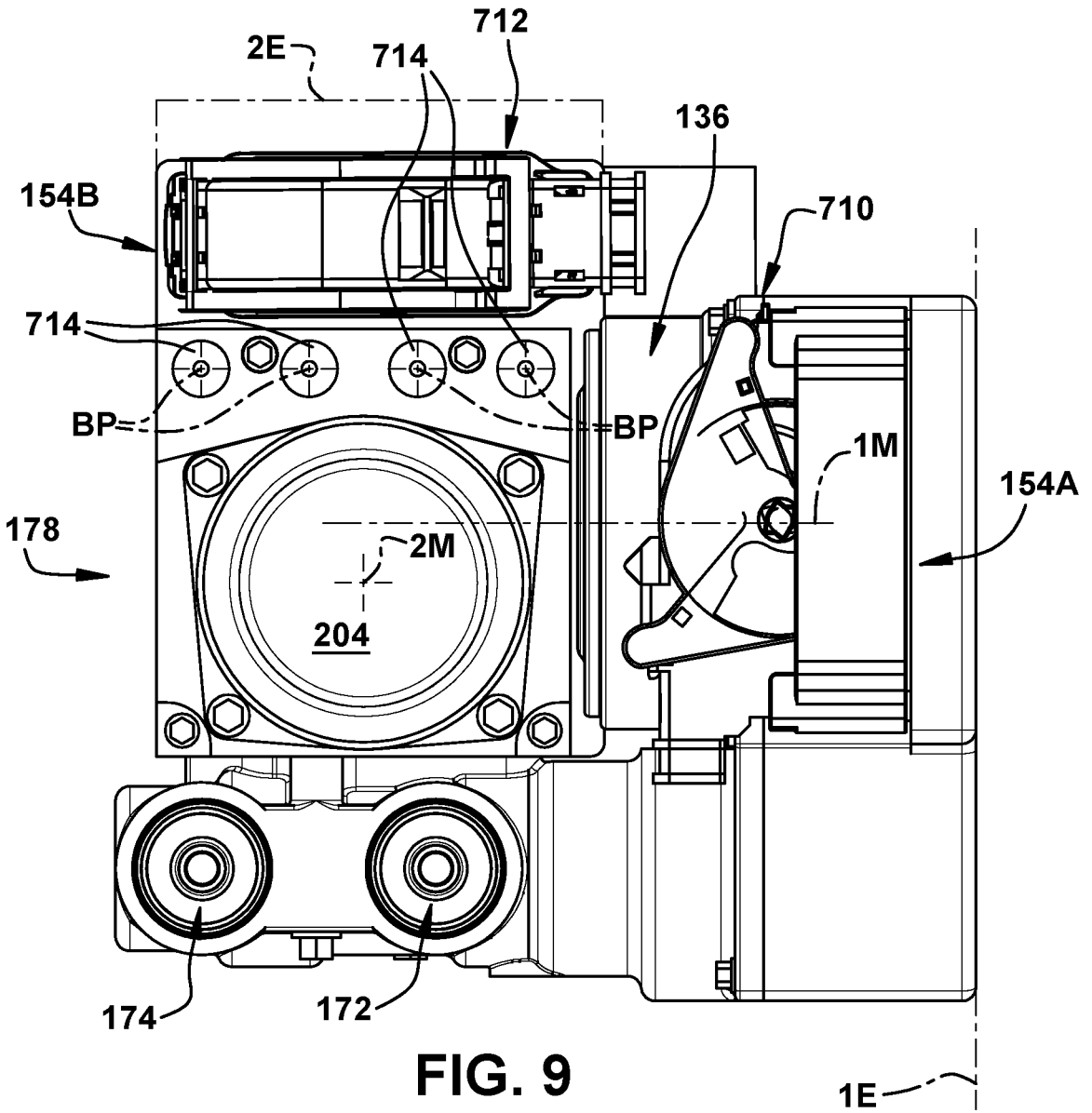
FIG. 9 is a front view of the example arrangement of FIG. 7.
Figure 10:
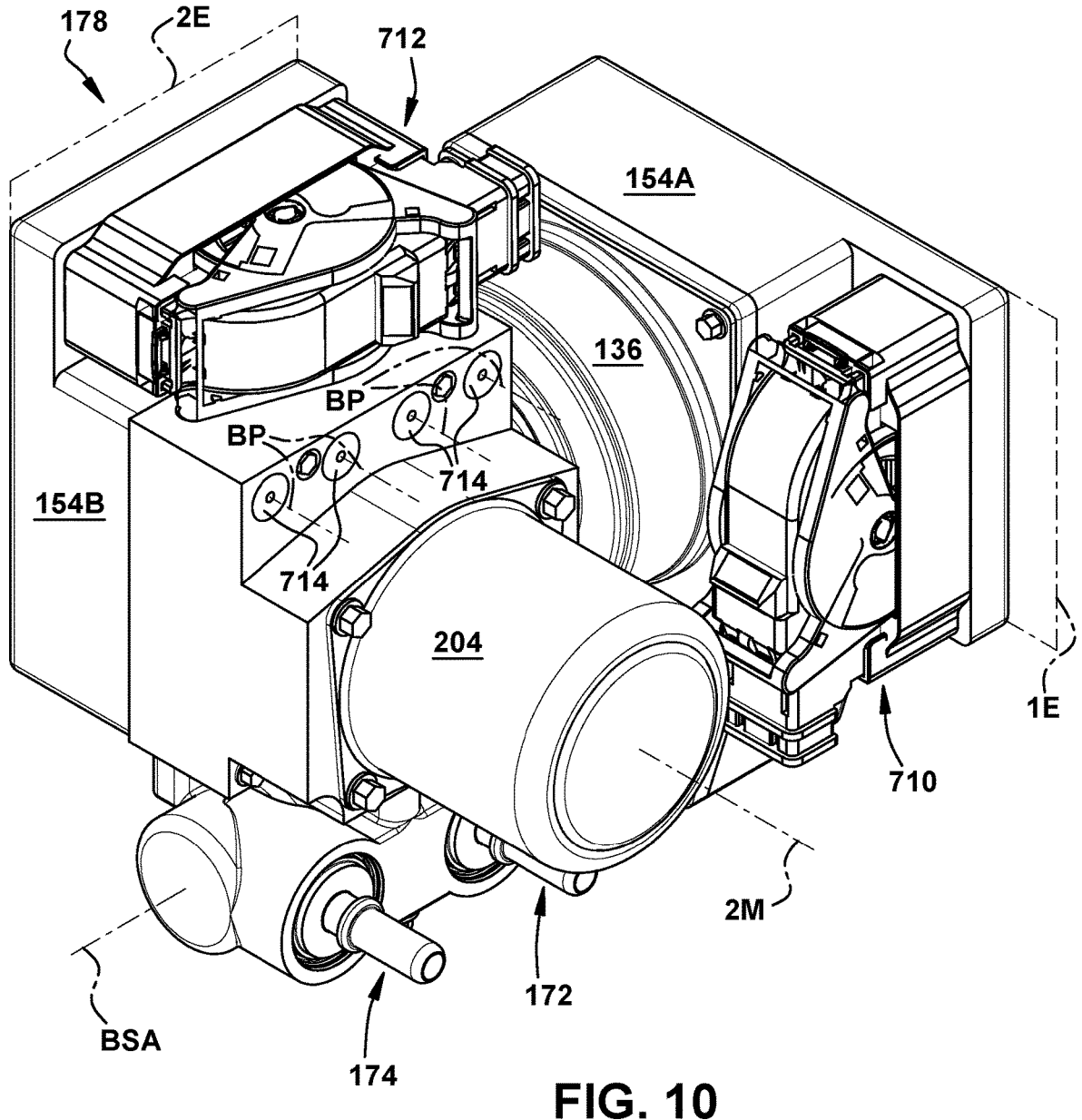
FIG. 10 is a perspective front view of the example arrangement of FIG. 7.

FIG. 6 schematically depicts an example brake system 178 for actuating a plurality of wheel brakes 184 in a normal non-failure mode and in a backup braking mode. The brake system 178 is shown here as a hydraulic braking system, in which fluid pressure is utilized to apply braking forces for the brake system 178. The brake system 178 may suitably be used on a ground vehicle, such as an automotive vehicle having four wheels with a wheel brake associated with each wheel. Furthermore, the brake system 178 can be provided with other braking functions such as anti-lock braking (ABS) and other slip control features to effectively brake the vehicle. Components of the brake system 178 may be housed in one or more blocks or housings, as will be discussed further below. The blocks or housings may be made from solid material, such as aluminum, that has been drilled, machined, or otherwise formed to house the various components. Fluid conduits may also be formed in the block or housing. For brevity, the MC-type PTU will be referenced as 100 in the description of the brake system 178, but one of ordinary skill in the art will understand that the MC-type PTU 100', or any other desired fluid pressure source could be used with the brake system 178 shown in FIG. 6.

In the illustrated embodiment of the brake system 178 of FIG. 6, there are four wheel brakes 184, which each can have any suitable wheel brake structure operated electrically and/or by the application of pressurized brake fluid. Each of the wheel brakes 184 may include, for example, a brake caliper mounted on the vehicle to engage a frictional element (such as a brake disc) that rotates with a vehicle wheel to effect braking of the associated vehicle wheel. The wheel brakes 184 can be associated with any combination of front and rear wheels of the vehicle in which the corresponding brake system 178 is installed. For example, the brake system 178 may be configured as a vertically split or diagonally split system. No differentiation is made herein among the wheel brakes 184, for the purposes of this description, though one of ordinary skill in the art could readily provide a suitable braking arrangement for a particular use environment.

Electric brake motors may be provided for selectively electrically actuating any of the corresponding wheel brakes

184, as desired, in parking and/or service modes. It is contemplated that the wheel brakes 184 could each be powered electrically and/or hydraulically—for example, a selected two of the wheel brakes 184 could be electrically powered and an other two of the wheel brakes 184 could be hydraulically powered, and/or at least one of the wheel brakes 184 could be powered electrically during certain phases of operation and hydraulically during other phases of operation, of the same brake system 178. It is also contemplated that one or more hydraulically and/or electrically powered parking brakes could be provided to any of the wheels of the vehicle, as desired.

As shown in FIG. 6, electric brake motors 164 are provided to a selected two of the wheel brakes 184 such as, for example, at the two rear wheels of the vehicle. Each electric brake motor 164 is operative to selectively drive a selected wheel brake 184. The brake motors 164 may be actuated in response to a brake signal to apply the corresponding wheel brakes 184 under electrical power instead of, or in addition to, hydraulic power from the MC-type PTU 100, in service and/or parking brake modes.

Also for the sake of description, it is presumed that a deceleration signal transmitter (shown schematically at 186) is configured to provide a braking signal, in a wired or wireless manner, corresponding to a desired braking action by an operator of the vehicle. The deceleration signal transmitter 186 may include a brake pedal 168 connected thereto, which is selectively actuated by a driver of the vehicle to indicate a desired braking command. The brake pedal unit 168 has at least one brake sensor (and potentially more, for redundancy) for determining a position of the brake pedal 168 and responsively producing a braking signal corresponding to the desired braking command. The braking signal is transmitted, wired or wirelessly, to at least one ECU 154. The deceleration signal transmitter 186 could include, but not be limited to, a brake pedal 168, an autonomous braking controller, and/or any other suitable scheme for generating a braking signal from which the brake system 178 can be actuated.

The brake systems 178 also includes a fluid reservoir 188. The reservoir 188 stores and holds hydraulic fluid for the brake system 178. The fluid within the reservoir 188 is preferably held at or about atmospheric pressure, but the fluid may be stored at other pressures if desired. The reservoir 188 is shown schematically having two tanks or sections with fluid conduit lines connected thereto. The sections can be separated by interior walls within the reservoir 188 and are provided to prevent complete drainage of the reservoir 188 in case one of the sections is depleted due to a leakage via one of the three lines connected to the reservoir 188. Alternatively, the reservoir 188 may include multiple separate housings. The reservoir 188 may include at least one fluid level switch or sensor 190 (two shown, for redundancy) for detecting the fluid level of one or more of the sections of the reservoir 188 in any desired manner.

The MC-type PTU 100 of the brake system 178 functions as a source of pressure to provide a desired pressure level to the hydraulically operated wheel brakes 184 during a typical or normal non-failure brake apply. After a brake apply, fluid from the wheel brakes 184 may be returned to the MC-type PTU 100 and/or be diverted to the reservoir 188. It is also contemplated that other configurations (not shown) of the brake system 178 could include hydraulic control of just selected one(s) of the wheel brakes (with the others being electrically controlled/actuated). One of ordinary skill in the art would be readily able to provide such an arrangement for a desired use environment, following aspects of the present invention.

An iso/dump control valve arrangement is associated with each wheel brake 184 of the plurality of wheel brakes 184. Each iso/dump control valve arrangement includes an iso valve 192 and a dump valve 194, for providing desired fluid routing to an associated wheel brake 184. The reservoir 188 is hydraulically connected to the MC-type PTU 100 and to each of the iso/dump control valve arrangements, such as via the return lines 196 (two shown). The iso/dump control valve arrangements each include respective serially arranged iso and dump valves 192 and 194. The normally open iso valve 192 for each iso/dump control valve arrangement is located hydraulically between a respective wheel brake 184 and the MC-type PTU 100, and the normally closed dump valve 194 for each iso/dump control valve arrangement is located hydraulically between a respective wheel brake 184 and the reservoir 188, for the corresponding wheel brake 184. The reservoir 188 is hydraulically connected to the MC-type PTU 100 and to each of the iso/dump control valve arrangements.

The iso/dump control valve arrangements may selectively provide slip control to at least one wheel brake 184 powered by the MC-type PTU 100 and/or the pump/motor unit described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

A first traction control iso valve 198 is hydraulically interposed between the MC-type PTU 100 and at least one iso/dump control valve arrangement via the first output channel 132 (here, via primary output line 180). A second traction control iso valve 200 is hydraulically interposed between the MC-type PTU 100 and at least one iso/dump control valve arrangement via the second output channel 134 (here, via secondary output line 182).

A pump piston 202 is associated with at least one wheel brake 184 of the plurality of wheel brakes 184. The pump piston 202 is driven by a second electric motor 204 (as differentiated from the electric motor 136 included in the MC-type PTU 100) for selectively providing pressurized hydraulic fluid to the iso/dump control valve arrangement of at least one wheel brake 184 which is associated with the pump piston 202. Together, the pump piston(s) 202 and second electric motor 204 can be considered to comprise a secondary brake module ("SBM") of the brake system 178.

In the brake system 178 of FIG. 6, a plurality of pump pistons 202 (three, as shown here) are associated with each "side" of a plurality of wheel brakes 184 in the brake system 178, such that each wheel brake 184 has at least one associated pump piston 202. There may be, accordingly, two or more total pump pistons 202 in the brake system 178, though it should be appreciated that any desired plurality (e.g., six) of pump pistons could be ganged together and used to supply fluid to one or more wheel brakes 184. The use of an even number pump pistons 202 may be helpful in attaining desired balanced pumping rotations in a rotary style pump structure. Simply, however, the plurality of pump pistons 202 associated with one or more wheel brakes 184 allows for enough hydraulic fluid to be pressurized and moved through the system that the brake system 178 has sufficient fluid resources to provide both slip control and boosted braking, in addition to, or instead of, the MC-type PTU 100.

The secondary brake module of the brake systems 178 functions as a source of pressure to provide a desired pressure level to selected ones of the wheel brakes 184 in a backup or "failed" situation, when, for some reason, the MC-type PTU 100 is unable to provide fluid to those selected wheel brakes 184. The secondary brake module can be used to selectively provide hydraulic fluid to at least one of the wheel brakes 184 in a backup braking mode, but also in an enhanced braking mode, which can occur on its own and/or concurrently with either the backup braking mode or a non-failure normal braking mode. Examples of suitable enhanced braking mode functions available to the brake system 178 include, but are not limited to, "overboost" (in which higher pressure is provided to a particular brake than would normally be available from the MC-type PTU 100 alone) and "volume-add" (in which more fluid is provided to a particular brake than would normally be available from the MC-type PTU 100). One of ordinary skill in the art will be readily able to configure a brake system 178 for any particular use application as desired.

The brake system 178 shown in FIG. 6 also includes at least one electronic control unit ("ECU") 154, with first, second, and third ECUs 154A, 154B, and 154C being shown and described herein. The ECUs 154A, 154B, 154C may include microprocessors and other electrical circuitry. The ECUs 154A, 154B, 154C receive various signals, process signals, and control the operation of various electrical components of a corresponding brake system 178 in response to the received signals, in a wired and/or wireless manner. The ECUs 154A, 154B, 154C can be connected to various sensors such as the reservoir fluid level sensor(s) 190, pressure sensors, travel sensors, switches, wheel speed sensors, and steering angle sensors. The ECUs 154A, 154B, 154C may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 154A, 154B, 154C may be connected to the instrument cluster for collecting and supplying information related to warning indicators such as an ABS warning light, a brake fluid level warning light, and a traction control/vehicle stability control indicator light. It is contemplated that at least one of the ECUs 154A and 154B may be, for example, integrated into the MC-type PTU 100, such as those shown and described with reference to FIGS. 1-5.

The first ECU 154A is operative to control the electric motor 136 of the MC-type PTU 100, as shown in FIGS. 1-5. The second ECU 154B is operative to control the second electric motor 204, at least one of the iso/dump control valve arrangements, and at least one of the first and second traction control iso valves 198, 200. The third ECU 154C is operative to control the electric brake motor(s) 164. An example of a suitable ECU 154 arrangement is disclosed in co-pending U.S. patent application Ser. No. 17/708,019, filed 30 Mar. 2022 and titled "Control Arrangement for a Brake System", hereafter referenced as "the backed-up ECU"), which is incorporated by reference herein in its entirety for all purposes. The braking signal from the deceleration signal transmitter 186 is transmitted to at least one of the first, second, and third ECUs 154A, 154B, 154C. The first, second, and third ECUs 154A, 154B, 154C control at least one of the first electric motor 136, second electric motor 204, and electric brake motor(s) 164 responsive to the braking signal. It is contemplated that, in particular use environments, the first and/or third ECUs 154A, 154C may also or instead control at least one of the iso/dump control valve arrangements, and at least one of the first and second traction control iso valves 198, 200.

Through use of the first, second, and third ECUs 154A, 154B, 154C, the brake system 178 may be configured for redundancy and back-up operation, to maintain braking function for the vehicle despite a number of different potential component failures (permanent or temporary). That is, the plurality of wheel brakes 184 may each receive pressurized hydraulic fluid from a respective primary or secondary output line 180, 182 of the MC-type PTU 100 in the normal non-failure braking mode, under control of the first ECU 154A. Then, in the backup braking mode, at least one of the plurality of wheel brakes 184 receives pressurized hydraulic fluid from a pump piston 202, under influence of the second electric motor 204, under control of the second ECU 154B. (Although, as previously mentioned, the pump pistons 202 could be used to provide pressurized hydraulic fluid to one or more wheel brakes 184 in the normal non-failure mode, as well, when desired.) In either the normal non-failure or backup braking modes, the electric brake motors 164 could be actuated by the third ECU 154C to supplement or supplant the hydraulically applied wheel brakes 184 at the corresponding positions.

The first and second electric motors 136, 202 may be of a "dual-wound" type, including a first winding selectively controlled by the first ECU 154A and a second winding selectively controlled by the second ECU 154B. In such case, even if one of the first and second ECUs 154A, 154B were to fail to send a signal to the respective winding, then the other of the first and second ECUs 154A, 154B could still be used to actuate the corresponding winding and maintain redundant function for that motor.

Similarly, any of the various first and second electric motors 136, 202, the electric brake motor(s) 164, the iso valves 192, the dump valves 194, the first and second traction control iso valves 198, 200, and/or any of the solenoid-controlled components of the brake system 178 may be of a "dual wound" type and/or may have a single wound coil with two separated drive circuits in the brake system 178. As a result, two or more of the first, second, and third ECUs 154A, 154B, and 154C would be capable of operating such "redundantly configured" valves and/or motors as desired. Through the redundancy of the first and second electric motors 136, 202, electric brake motor(s) 164, and the dual windings of the valves of the brake system 178, any of the first, second, and third ECUs 154A, 154B, and 154C could thus be capable of controlling up to the entire brake system 100, should the other ECUs be unavailable.

In the brake system 178 shown and described herein, the pump pistons 202 are able to pull hydraulic fluid directly from the reservoir 188. During certain phases of operation, the pump pistons 202 may provide pressurized fluid to the MC-type PTU 100 via the primary and/or secondary output lines 180, 182, in a manner that tends to "backdrive" the MC-type PTU 100. Because there is no brake pedal attached to the MC-type PTU 100 this "backdrive" feature may be desirable in some circumstances to facilitate brake venting, to avoid working the electric motor 136 and the second electric motor 204 against each other, or for any other desired reason.

In the brake system 178, each pump piston 202 is able to route fluid directly to and from the reservoir 188 via the return lines 196, as desired. In the brake system 178 of FIG. 6, the reservoir 188 includes first and second reservoir fluid sensors 190, with each of the first and second reservoir fluid sensors 190 being in electronic communication with respective first and second electronic control units 154A, 154B. As a result, even if one of the ECUs 154A, 154B is not available to the brake system 178B for some reason, fluid levels in the reservoir 188 can be monitored and adjusted via control of either the electric motor 136 or the second electric motor 204, depending upon which of the ECUs 154A, 154B is still available within the brake system 178B at that time.

It is contemplated that various other components, such as additional electric service and/or parking brake motors, could be provided by one of ordinary skill in the art to achieve desired configurations for particular use environments, in any of the brake systems 178 described herein. For example, while a number of filters and pressure sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

In FIG. 6, dashed lines schematically delineate or divide the various components of the brake system 178 into co-located sets. For example, the "upper" area (marked "PBMH", for "primary brake module housing") includes at least the MC-type PTU 100. (Here, the reservoir 188 is also shown as included in the PBMH set, but the reservoir could instead be located remotely and connected to the PBMH by one or more fluid lines.) The "lower" area of FIG. 6 is marked "SBMH" (for "secondary brake module housing") and includes at least the iso valves 192, the dump valves 194, the first and second traction control iso valves 198, 200, the pump pistons 202, and the pump motor 204. (As an option, instead of being delineated by the dashed lines in FIG. 6, the MC-type power transmission unit 100, the second electric motor 204, the pump piston 202, at least one of the iso/dump control valve arrangements, and at least one of the first and second traction control iso valves 198, 200 may be contained in a single unitary brake housing block.)

FIGS. 7-10 schematically depict a physical arrangement of components in the brake system 178 corresponding to the separate PBMH/SBMH sets. As shown, the MC-type PTU 100 is contained in a first brake housing block 706 (representing the PBMH set), and the second electric motor 204, the pump piston 202, at least one of the iso/dump control valve arrangements, and at least one of the first and second traction control iso valves 198, 200 are contained in a second brake housing block 708 (representing the SBMH set), spaced apart from the first brake housing block 706. The reservoir 188 may be contained in the first brake housing block 706, as previously mentioned. The first and second brake housing blocks 706, 708

As shown in FIGS. 7-10, hybrid electrical connectors are provided, with PBM and SBM hybrid connectors 710, 712 being provided for connection in a known manner to outside electric and/or signal lines of the vehicle associated with the brake system 178.

With reference to the axis lines as labeled in FIGS. 7-10, the first electric motor 136 defines a (central) first motor axis 1M, the second electric motor 204 defines a (central) second motor axis 2M, and the first and second motor axes 1M and 2M are substantially mutually perpendicular, although may be offset in at least one direction (i.e., not directly crossing), as shown in the Figures.

A plurality of brake ports 714 are provided. Each brake port 714 defines a brake port axis BP along a fluid flow direction and is configured to selectively place a selected iso/dump control valve arrangement into fluid communication with a corresponding wheel brake 184. The brake port axes BP (extending into and out of the plane of the page in FIG. 9) are substantially mutually parallel to each other and to the second motor axis 2M. This is particularly apparent in the views of FIGS. 9-10. Since the second motor axis 2M is substantially perpendicular to the first motor axis 1M, the brake port axes BP are also substantially perpendicular to the first motor axis 1M. The primary and secondary reservoir channels 172 and 174 also define central axes substantially parallel to each other and to the brake port axes, as shown in the Figures. The brake ports 714 and primary/secondary reservoir channels 172/174 all open toward the same direction (out of the plane of the page, in the orientation of FIG. 9).

The first electronic control unit 154A defines a first ECU plane 1E extending perpendicular to the first motor axis 1M. The second electronic control unit 154B defines a second ECU plane 2E extending perpendicular to the second motor axis 2M. The first and second ECU planes 1E, 2E are mutually perpendicular.

The ball screw defines a ball screw axis BSA extending parallel to the ball screw 102. The ball screw axis BSA is substantially parallel to, and offset from, the first motor axis 1M and substantially perpendicular to the second motor axis 2M.

Through arrangement of the various components of the brake system 178 as shown in FIGS. 7-10, a compact arrangement can be made, which may provide a desirable volume envelope and footprint for particular use environments of the brake system 178.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a plurality of wheel brakes in a normal non-failure braking mode and in a backup braking mode, the brake system comprising:

an MC power transmission unit having a first electric motor for at least partially pressurizing hydraulic fluid;

first and second output lines for routing the pressurized hydraulic fluid from the MC power transmission unit;

an iso/dump control valve arrangement associated with each wheel brake of the plurality of wheel brakes;

a first traction control iso valve hydraulically interposed between the MC power transmission unit and at least one iso/dump control valve arrangement via the first output line;

a second traction control iso valve hydraulically interposed between the MC power transmission unit and at least one iso/dump control valve arrangement via the second output line;

a pump piston associated with at least one wheel brake of the plurality of wheel brakes, the pump piston being driven by a second electric motor for selectively providing pressurized hydraulic fluid to the iso/dump control valve arrangement of the at least one associated wheel brake;

a reservoir hydraulically connected to the MC power transmission unit and each of the iso/dump control valve arrangements;

at least one electric brake motor, each electric brake motor being operative to selectively drive a selected wheel brake;

a first electronic control unit operative to selectively control the electric motor of the MC power transmission unit;

a second electronic control unit operative to selectively control the second electric motor, at least one of the iso/dump control valve arrangements, and at least one of the first and second traction control iso valves; and a third electronic control unit operative to control the at least one electric brake motor, the MC power transmission unit having:

a ball screw, a ball nut selectively driven by the ball screw for longitudinal motion relative thereto, a primary piston operatively coupled to the ball nut;

a secondary piston operatively coupled to the primary piston, a primary chamber at least partially defined by a surface of the primary piston, the primary chamber being configured to contain hydraulic fluid and selectively pressurized by reciprocal motion of the primary piston driven directly by longitudinal motion of the ball nut, a secondary chamber at least partially defined by a face of the secondary piston, a backside of the secondary piston at least partially defining the primary chamber, the secondary chamber being configured to contain hydraulic fluid and selectively pressurized by reciprocal motion of the secondary piston driven indirectly by longitudinal motion of the ball nut, a first output channel selectively placing the primary chamber in fluid communication with the first output line, a second output channel selectively placing the secondary chamber in fluid communication with the second output line, and the first electric motor selectively drives the ball screw to responsively reciprocate at least one of the primary and secondary pistons within a corresponding primary or secondary chamber.

2. The brake system of claim 1, including at least one return line placing the reservoir and the pump piston in direct hydraulic connection, wherein the reservoir includes first and second reservoir fluid sensors in electronic communication with respective first and second electronic control units.

3. The brake system of claim 1, including a plurality of pump pistons.

4. The brake system of claim 3, wherein each wheel brake has at least one associated pump piston.

5. The brake system of claim 1, wherein the first electric motor has a first winding selectively controlled by the first electronic control unit, and the first electric motor has a second winding selectively controlled by the second electronic control unit.

6. The brake system of claim 1, wherein the plurality of wheel brakes receives pressurized hydraulic fluid from a respective primary or secondary output line of the MC power transmission unit in the normal non-failure braking mode.

7. The brake system of claim 1, wherein at least one wheel brake receives pressurized hydraulic fluid from the pump piston in the backup braking mode.

8. The brake system of claim 1, wherein the first electric motor is drivingly coupled to the ball screw by a PTU belt drive system.

9. The brake system of claim 8, wherein the belt drive system includes a spring-loaded idler.

10. The brake system of claim 1, wherein the first electric motor is drivingly coupled to the ball screw by a PTU gear train.

11. The brake system of claim 1, including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first, second, and third electronic control units, and the at least one of the first, second, and third electronic control units controlling at least one of the first electric motor, second electric motor, and electric brake motor responsive to the braking signal.

12. The brake system of claim 11, wherein the braking signal is wirelessly transmitted to the electronic control unit.

13. The brake system of claim 1, wherein the MC power transmission unit is contained in a first brake housing block, and the second electric motor, the pump piston, at least one of the iso/dump control valve arrangements, and at least one of the first and second traction control iso valves are contained in a second brake housing block, spaced apart from the first brake housing block.

14. The brake system of claim 1, wherein the MC power transmission unit, the second electric motor, the pump piston, at least one of the iso/dump control valve arrangements, and at least one of the first and second traction control iso valves are contained in a single unitary brake housing block.

15. The brake system of claim 13, wherein the reservoir is contained in the first brake housing block.

16. The brake system of claim 1, wherein the first electric motor defines a first motor axis, the second electric motor defines a second motor axis, and the first and second motor axes are mutually perpendicular.

17. The brake system of claim 16, including a plurality of brake ports, each brake port defining a brake port axis along a fluid flow direction and being configured to selectively place a selected iso/dump control valve arrangement into fluid communication with a corresponding wheel brake, wherein the brake port axes are mutually parallel to each other and to the second motor axis.

18. The brake system of claim 16, wherein the first electronic control unit defines a first ECU plane extending perpendicular to the first motor axis, the second electronic control unit defines a second ECU plane extending perpendicular to the second motor axis, and the first and second ECU planes are mutually perpendicular.

19. The brake system of claim 16, wherein the ball screw defines a ball screw axis, and the ball screw axis is parallel to the first motor axis and perpendicular to the second motor axis.

20. A brake system for actuating a plurality of wheel brakes in a normal non-failure braking mode and in a backup braking mode, the brake system comprising:

an MC power transmission unit having a first electric motor for at least partially pressurizing hydraulic fluid, the first electric motor defining a first motor axis;

first and second output lines for routing the pressurized hydraulic fluid from the MC power transmission unit;

an iso/dump control valve arrangement associated with each wheel brake of the plurality of wheel brakes;

a first traction control iso valve hydraulically interposed between the MC power transmission unit and at least one iso/dump control valve arrangement via the first output line;

a second traction control iso valve hydraulically interposed between the MC power transmission unit and at least one iso/dump control valve arrangement via the second output line;

a pump piston associated with at least one wheel brake of the plurality of wheel brakes, the pump piston being driven by a second electric motor for selectively providing pressurized hydraulic fluid to the iso/dump control valve arrangement of the at least one associated wheel brake, the second motor defining a second motor axis, the first and second motor axes being mutually perpendicular;

a reservoir hydraulically connected to the MC power transmission unit and each of the iso/dump control valve arrangements;

at least one electric brake motor, each electric brake motor being operative to selectively drive a selected wheel brake;

a first electronic control unit operative to selectively control the electric motor of the MC power transmission unit;

a second electronic control unit operative to selectively control the second electric motor, at least one of the iso/dump control valve arrangements, and at least one of the first and second traction control iso valves;

a third electronic control unit operative to control the at least one electric brake motor; and a plurality of brake ports, each brake port defining a brake port axis along a fluid flow direction and being configured to selectively place a selected iso/dump control valve arrangement into fluid communication with a corresponding wheel brake, the brake port axes being mutually parallel to each other and to the second motor axis.

21. The brake system of claim 20, wherein the MC power transmission unit is contained in a first brake housing block, and the second electric motor, the pump piston, the plurality of brake ports, at least one of the iso/dump control valve arrangements, and at least one of the first and second traction control iso valves are contained in a second brake housing block, spaced apart from the first brake housing block.

22. The brake system of claim 21, further including a plurality of reservoir channels, each reservoir channel defining a reservoir channel axis and being configured to place the MC power transmission unit into fluid communication with the reservoir, the reservoir channel axes being mutually parallel to each other and to the second motor axis.

* * * * *